(No Model.)
J. A. BILZ.
VINEYARD PLOW.
No. 417,855. Patented Dec. 24, 1889.
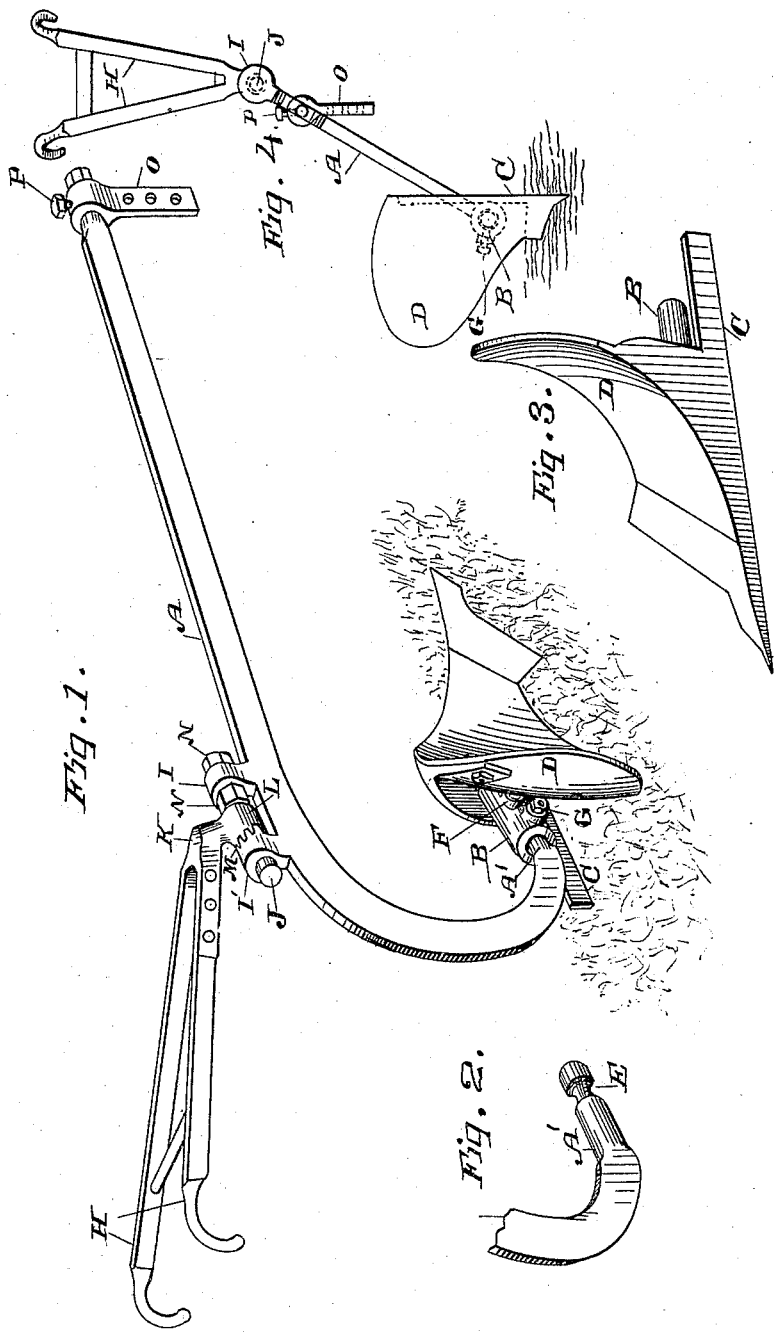
Witnesses,
Geo. H. Strong
J. H. nurse
Inventor,
John A. Bilz
By Dewey & Co.
Atty

UNITED STATES PATENT OFFICE.

JOHN A. BILZ, OF PLEASANTON, CALIFORNIA.

VINEYARD-PLOW.

SPECIFICATION forming part of Letters Patent No. 417,855, dated December 24, 1889.

Application filed August 30, 1889. Serial No. 322,440. (No model.)

*To all whom it may concern:*

Be it known that I, JOHN A. BILZ, of Pleasanton, Alameda county, State of California, have invented an Improvement in Vineyard-Plows; and I hereby declare the following to be a full, clear, and exact description of the same.

My invention relates to a novel construction for plows, which is especially adapted for cultivating the soil where there are rows of vines, shrubs, or trees, and where it is necessary to plow close to the roots or stems, while maintaining the beam and handles of the plow at a considerable distance to one side in order to avoid the limbs and upper portion of the plant.

It consists in the combination of a reversible plow, a beam to which said plow is connected and about which it may be turned, and handles and clevis made adjustable with relation to the beam, so as to stand at any desired angle thereto.

Referring to the accompanying drawings for a more complete explanation of my invention, Figure 1 is a perspective view of my plow. Fig. 2 is a view of the lower rear portion of the plow-beam, showing the fitting for preventing the plow from being detached from the shank upon which it rotates. Fig. 3 is a view of the plow removed from the beam. Fig. 4 is a front end view of the plow with the beam turned to one side.

A is a plow-beam, which in the present case is shown as made of iron and curved around in the form of a semicircle at the rear end, so that the lower end extends approximately parallel with the upper portion of the beam A. This end A' is made cylindrical, so that the sleeve B, which is formed in the rear portion of the plow, between the landside C and the mold-board D, may slip over this circular portion and be capable of turning upon it, so as to set the plow at any desired angle with reference to the beam A.

A groove or notch E is formed around the cylindrical axis A', and a set-screw F passes through the sleeve B, its point entering this groove E and preventing the plow from slipping off from the axis A'. The plow may be fixed upon the axis at any desired angle by means of the set-screw G passing through the sleeve B, so that its point may be screwed hard against the axis A', and thus hold the plow rigidly at any desired angle. This angle will be determined by the position of the plow with relation to the row of vines or shrubs which are to be cultivated. If the plow is to be run upon one side, so that the mold-board travels next to the row of vines, then the beam A is to be turned so as to throw the lower part and axis A' toward the stems of the vines, the plow being set at a corresponding angle upon the axis, so that it maintains its relative vertical position in the soil independent of the angle at which the plow-beam stands.

H are the handles of the plow, which are attached to the beam as follows: I and I' are lugs formed with or fixed upon the plow-beam near its rear end and perforated parallel with the beam, to allow a bolt or pin J to pass through. At the meeting end of the handles H is fixed an iron fork or socket, to which the handles are bolted or otherwise secured.

L is a cylindrical extension formed below the socket-irons K and rigid with them, and this extension has its rear end formed into teeth, as shown at M. These teeth engage with corresponding teeth in the rear lug I', and when the pin J has been passed through the lugs and the point L, and the nut N screwed upon its end, the teeth M will engage, as shown in Fig. 1, and the handles will be held rigidly with relation to the plow-beam A. When, however, the beam has been turned to one side, so as to throw the plow to one side or the other of a vertical line, it will be necessary to set the handles so that they will stand in a proper vertical plane independent of the angular position of the plow-beam A. This is effected by loosening the nut N and the bolt J, so as to allow the toothed portion L to be turned around as far as may be needed to set the handles H in the proper vertical position and parallel with the plow, which has also been adjusted, as before described. The teeth M being engaged in the proper place to accomplish this object, the bolt J is again tightened up in place and the whole plow is held rigidly together, the handles H and the plow standing in the proper relative vertical position with reference to the surface to be cultivated, while the beam A stands at such an inclination as is necessary to throw the plow as far toward the plant-stems as desired for the purpose of cultivation. It will be manifest that when the plow is thrown to the opposite side—that is, with the landside toward the stems on the left—the plow will be shifted upon the axis A', and the handles will be also shifted with relation to the beam A, which then stands at an angle in the opposite direction from that first described, the handles and plow being again adjusted to the proper vertical position.

The clevis O is attached to the front of the plow-beam A by means of a swiveling socket, as shown, and this clevis may be turned upon the end of the beam, which is fitted for that purpose, and set at any desired angle, so as to throw the draft wherever desired with relation to the plow-beam, it being set in any desired position by means of the set-screw P, which holds it in the proper place.

Having thus described my invention, what I claim as new, and desire to secure by Letters Patent, is—

1. In a plow, the beam having a shank or axis at its lower rear end approximately parallel with the direction of travel, in combination with the plow having the sleeve fitted upon the said axis, a set or holding screw whereby the plow may be adjusted and held to any angle with relation to the beam, and means for adjusting and holding the handles with relation to the beam, substantially as described.

2. The plow-beam having the shank or axis at its lower rear end, a groove or channel formed around said axis, in combination with the plow having the sleeve fitted to the axis, a screw passing through said sleeve so that its point enters the groove or channel, a second set or holding screw, whereby the plow is locked upon the axis at any desired angle with the beam, adjustable handles, and means for locking them at any angle with relation to the plow, substantially as described.

3. A plow-beam and a plow fitted to the axis on the lower rear end of said beam and adjustable to any angle with relation thereto, in combination with handles correspondingly adjustable to the upper part of the beam, and a means for locking and holding said handles with relation to the beam, substantially as described.

4. The plow-beam having the lugs upon its upper rear portion, the plow-handles with the socket or shoe to which they are attached, the cylindrical toothed or serrated sleeve adapted to engage corresponding teeth in one or both of the lugs upon the plow-beam, and the holding bolt and nut whereby they are locked in place, substantially as described.

5. In a plow, the beam A, having the axis at the lower rear end, the plow adjustable upon said axis, and a means for fixing it at any angle with relation to the beam, handles adjustable to the upper rear portion of the beam, and a means for locking them at any angle with relation thereto, in combination with the clevis, which may be turned upon the forward end of the plow-beam, having an extension to one side thereof, and a means for locking it in any desired position, substantially as described.

In witness whereof I have hereunto set my hand.

JOHN A. BILZ.

Witnesses:
S. H. NOURSE,
H. C. LEE.